(12) United States Patent
Tajeddin et al.

(10) Patent No.: US 10,809,078 B2
(45) Date of Patent: Oct. 20, 2020

(54) METHOD, SYSTEM AND APPARATUS FOR DYNAMIC PATH GENERATION

(71) Applicant: SYMBOL TECHNOLOGIES, LLC, Lincolnshire, IL (US)

(72) Inventors: Sadegh Tajeddin, Mississauga (CA); Zichen Huang, Richmond Hill (CA); Harsoveet Singh, Mississauga (CA)

(73) Assignee: Symbol Technologies, LLC, Holtsville, NY (US)

( * ) Notice: Subject to any disclaimer, the term of this patent is extended or adjusted under 35 U.S.C. 154(b) by 159 days.

(21) Appl. No.: 15/946,346

(22) Filed: Apr. 5, 2018

(65) Prior Publication Data

US 2019/0310092 A1 Oct. 10, 2019

(51) Int. Cl.
| | | |
|---|---|---|
| *G01C 21/34* | (2006.01) | |
| *G01C 21/20* | (2006.01) | |
| *G01C 22/00* | (2006.01) | |
| *B25J 9/16* | (2006.01) | |
| *G05D 1/02* | (2020.01) | |
| *G05D 1/00* | (2006.01) | |
| *G06F 16/29* | (2019.01) | |

(52) U.S. Cl.
CPC ..... *G01C 21/3415* (2013.01); *G01C 21/3453* (2013.01); *G06F 16/29* (2019.01)

(58) Field of Classification Search
CPC ........ G01C 21/34; G01C 21/20; G01C 22/00; B25J 9/16; G05D 1/02; G05D 1/00
See application file for complete search history.

(56) References Cited

U.S. PATENT DOCUMENTS

| | | |
|---|---|---|
| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |
| 5,988,862 A | 11/1999 | Kacyra et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

"Fair Billing with Automatic Dimensioning" pp. 1-4, undated, Copyright Mettler-Toledo International Inc.

(Continued)

*Primary Examiner* — Yuri Kan, P.E.

(57) ABSTRACT

A method of dynamic path generation in a navigational controller includes: generating (i) a plurality of paths extending from a starting location to a goal location, and (ii) a cost for each of the paths; selecting, based on the costs, an optimal path for execution from the plurality of paths; storing a subset of the costs in a cost history queue; responsive to detecting an obstacle during execution of the optimal path, retrieving one of the costs from the cost history queue; determining an initial re-planning search space based on the cost retrieved from the cost history queue; and initiating generation of a re-planned path within the initial re-planning search space.

18 Claims, 11 Drawing Sheets

(56) References Cited

U.S. PATENT DOCUMENTS

| | | |
|---|---|---|
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 * | 12/2016 | Kentley ............... B60R 21/01 |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,394,244 B2 * | 8/2019 | Song ..................... G06N 7/005 |
| 2001/0041948 A1 | 11/2001 | Ross et al. |
| 2002/0006231 A1 | 1/2002 | Jayant et al. |
| 2002/0097439 A1 | 7/2002 | Braica |
| 2002/0146170 A1 | 10/2002 | Rom |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |

(56) References Cited

U.S. PATENT DOCUMENTS

| | | |
|---|---|---|
| 2009/0060349 A1 | 3/2009 | Linaker et al. |
| 2009/0063306 A1 | 3/2009 | Fano et al. |
| 2009/0063307 A1 | 3/2009 | Groenovelt et al. |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1* | 4/2010 | Yabushita ............ G05D 1/0217 701/25 |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | VolKmann et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0307108 A1 | 6/2012 | Forutanpour |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1* | 1/2014 | Ryu ..................... G05D 1/02 700/245 |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Shaowering |
| 2014/0104413 A1 | 4/2014 | McCloskey et al. |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1 | 4/2015 | Patel et al. |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1 | 6/2016 | Schwartz |
| 2016/0171707 A1 | 6/2016 | Schwartz |
| 2016/0185347 A1 | 6/2016 | Lefevre et al. |

(56) References Cited

U.S. PATENT DOCUMENTS

| | | | |
|---|---|---|---|
| 2016/0191759 A1 | 6/2016 | Somanath et al. | |
| 2016/0253735 A1 | 9/2016 | Scudillo et al. | |
| 2016/0313133 A1* | 10/2016 | Zeng | B60W 30/0956 |
| 2016/0328618 A1 | 11/2016 | Patel et al. | |
| 2016/0353099 A1 | 12/2016 | Thomson et al. | |
| 2016/0364634 A1 | 12/2016 | Davis et al. | |
| 2017/0004649 A1 | 1/2017 | Collet Romea et al. | |
| 2017/0011281 A1 | 1/2017 | Dijkman et al. | |
| 2017/0011308 A1 | 1/2017 | Sun et al. | |
| 2017/0032311 A1 | 2/2017 | Rizzolo et al. | |
| 2017/0041553 A1 | 2/2017 | Cao et al. | |
| 2017/0066459 A1 | 3/2017 | Singh | |
| 2017/0074659 A1 | 3/2017 | Giurgiu et al. | |
| 2017/0150129 A1 | 5/2017 | Pangrazio | |
| 2017/0193434 A1 | 7/2017 | Shah et al. | |
| 2017/0219338 A1 | 8/2017 | Brown et al. | |
| 2017/0219353 A1* | 8/2017 | Alesiani | G05D 1/0217 |
| 2017/0227645 A1 | 8/2017 | Swope et al. | |
| 2017/0227647 A1 | 8/2017 | Baik | |
| 2017/0228885 A1 | 8/2017 | Baumgartner | |
| 2017/0261993 A1 | 9/2017 | Venable et al. | |
| 2017/0262724 A1 | 9/2017 | Wu et al. | |
| 2017/0280125 A1 | 9/2017 | Brown et al. | |
| 2017/0286773 A1 | 10/2017 | Skaff et al. | |
| 2017/0286901 A1 | 10/2017 | Skaff et al. | |
| 2017/0323376 A1 | 11/2017 | Glaser et al. | |
| 2018/0001481 A1 | 1/2018 | Shah et al. | |
| 2018/0005035 A1 | 1/2018 | Bogolea et al. | |
| 2018/0005176 A1 | 1/2018 | Williams et al. | |
| 2018/0020145 A1 | 1/2018 | Kotfis et al. | |
| 2018/0051991 A1* | 2/2018 | Hong | G01C 21/343 |
| 2018/0053091 A1 | 2/2018 | Savvides et al. | |
| 2018/0053305 A1 | 2/2018 | Gu et al. | |
| 2018/0101813 A1 | 4/2018 | Paat et al. | |
| 2018/0114183 A1 | 4/2018 | Howell | |
| 2018/0143003 A1 | 5/2018 | Clayton et al. | |
| 2018/0174325 A1 | 6/2018 | Fu et al. | |
| 2018/0201423 A1 | 7/2018 | Drzewiecki et al. | |
| 2018/0204111 A1 | 7/2018 | Zadeh et al. | |
| 2018/0281191 A1* | 10/2018 | Sinyavskiy | G05D 1/0274 |
| 2018/0293442 A1 | 10/2018 | Fridental et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2019/0057588 A1 | 2/2019 | Savvides et al. | |
| 2019/0065861 A1 | 2/2019 | Savvides et al. | |
| 2019/0073554 A1 | 3/2019 | Rzeszutek | |
| 2019/0180150 A1 | 6/2019 | Taylor et al. | |
| 2019/0197728 A1 | 6/2019 | Yamao | |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2019023249 | 1/2019 |

OTHER PUBLICATIONS

"Plane Detection in Point Cloud Data" dated Jan. 25, 2010 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Facade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing" ACM SIGGRAPH Computer Graphics, vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France.

Douillard, Bertrand, et al. "On the segmentation of 3D LIDAR point clouds." Robotics and Automation (ICRA), 2011 IEEE International Conference on IEEE, 2011.

Dubois, M., et al., A comparison of geometric and energy-based point cloud semantic segmentation methods, European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

(56) References Cited

OTHER PUBLICATIONS

Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference on, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Zhao Zhou et al.: "An Image contrast Enhancement Algorithm Using PLIP-based histogram Modification", 2017 3d IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
International Search Report and Written Opinion from International Patent Application No. PCT/US2019/064020 dated Feb. 19, 2020.
International Search Report and Written Opinion for International Patent Application No. PCT/US2013/053212 dated Dec. 1, 2014.
International Search Report and Written Opinion for International Patent Application No. PCT/US2013/070996 dated Apr. 2, 2014.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." ACM SIGGRAPH Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 dated Sep. 23, 2014.
Notice of allowance for U.S. Appl. No. 13/693,503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., etal. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passiv rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," In IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php].
Rusu, et al. "Spatial Change detection on unorganized point cloud data," PCL Library, retrieved from internet on Aug. 19, 2016 [http://pointclouds.org/documentation/tutorials/octree_change.php].

(56) References Cited

OTHER PUBLICATIONS

Schnabel et al. "Efficient RANSAC for Point-Cloud Shape Detection", vol. 0, No. 0, pp. 1-12 (1981).

Senthilkumaran, et al., "Edge Detection Techniques for Image Segmentation—A Survey of Soft Computing Approaches", International Journal of Recent Trends in Engineering, vol. 1, No. 2 (May 2009).

Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].

Tahir, Rabbani, et al., "Segmentation of point clouds using smoothness constraint,"International Archives of Photogrammetry, Remote Sensing and Spatial Information Sciences 36.5 (Sep. 2006): 248-253.

Trevor et al., "Tables, Counters, and Shelves: Semantic Mapping of Surfaces in 3D," Retrieved from Internet Jul. 3, 2018 @http://citeseerx.ist.psu.edu/viewdoc/download?doi=10.1.1.703.5365&rep=rep1&type=pdf, pp. 1-6.

Tseng, et al., "A Cloud Removal Approach for Aerial Image Visualization", International Journal of Innovative Computing, Information & Control, vol. 9, No. 6, pp. 2421-2440 (Jun. 2013).

Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).

United Kingdom Intellectual Property Office, "Combined Search and Examination Report" for GB Patent Application No. 1813580.6 dated Feb. 21, 2019.

United Kingdom Intellectual Property Office, Combined Search and Examination Report dated Jan. 22, 2016 for GB Patent Application No. 1417218.3.

United Kingdom Intellectual Property Office, Combined Search and Examination Report dated Jan. 22, 2016 for GB Patent Application No. 1521272.3.

United Kingdom Intellectual Property Office, Combined Search and Examination Report dated Mar. 11, 2015 for GB Patent Application No. 1417218.3.

Varol Gul et al: "Product placement detection based on image processing", 2014 22nd Signal Processing and Communication Applications Conference (SIU), IEEE, Apr. 23, 2014.

Varol Gul et al: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

* cited by examiner

METHOD, SYSTEM AND APPARATUS FOR DYNAMIC PATH GENERATION

BACKGROUND

Environments in which objects are managed, such as retail facilities, may be complex and fluid. For example, a retail facility may include objects such as products for purchase, a distribution environment may include objects such as parcels or pallets, a manufacturing environment may include objects such as components or assemblies, a healthcare environment may include objects such as medications or medical devices.

A mobile apparatus may be employed to perform tasks within the environment, such as capturing data for use in identifying products that are out of stock, incorrectly located, and the like. To travel within the environment, a path is generated extending from a starting location to a destination location. The generation of paths for use by the apparatus may be based on a search of an environmental map, and can be computationally demanding and therefore time-consuming. When an obstacle is detected by the apparatus that was not accounted for in a previously generated path, the path is generally discarded and a new search of the map is initiated, which may require an interruption in the operation of the apparatus.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
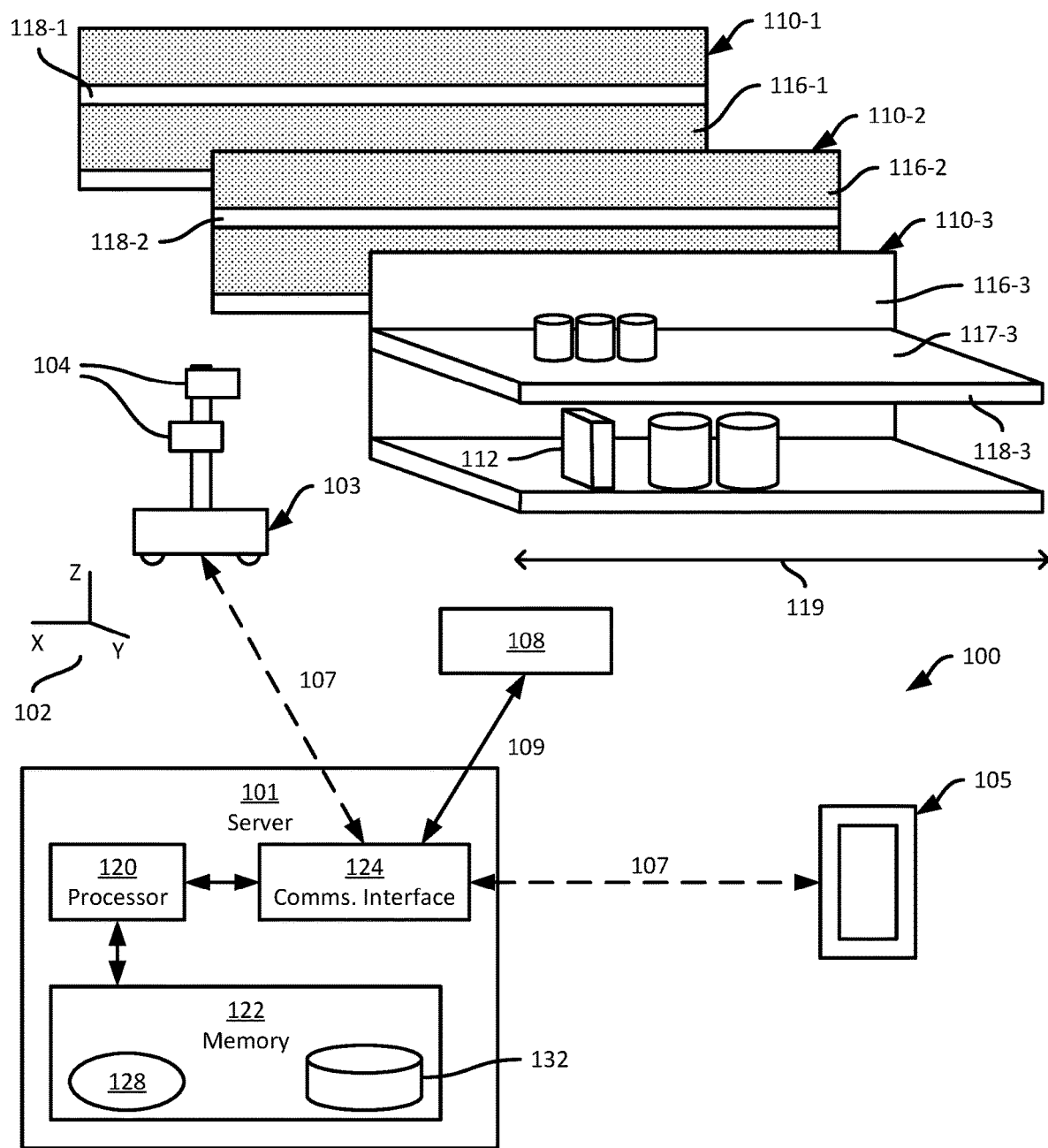
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamic path generation in a navigational controller including: generating (i) a plurality of paths extending from a starting location to a goal location, and (ii) a cost for each of the paths; selecting, based on the costs, an optimal path for execution from the plurality of paths; storing a subset of the costs in a cost history queue; responsive to detecting an obstacle during execution of the optimal path, retrieving one of the costs from the cost history queue; determining an initial re-planning search space based on the cost retrieved from the cost history queue; and initiating generation of a re-planned path within the initial re-planning search space.

Additional examples disclosed herein are directed to a mobile automation apparatus, comprising: a navigational controller including a path generator configured to: generate (i) a plurality of paths extending from a starting location to a goal location, and (ii) a cost for each of the paths; select, based on the costs, an optimal path for execution from the plurality of paths; and store a subset of the costs in a cost history queue; the navigational controller further including an executor configured to control a locomotive mechanism of the mobile automation apparatus to execute the optimal path; the path generator further configured, responsive to detection of an obstacle during the execution of the optimal path, to: retrieve one of the costs from the cost history queue; determine an initial re-planning search space based on the cost retrieved from the cost history queue; and initiate generation of a re-planned path within the initial re-planning search space.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 105 via communication links 107, illustrated in the present example as including wireless links. In the present example, the links 107 are provided by a wireless local area network (WLAN) deployed within the retail environment by one or more access points (not shown). In other examples, the server 101, the client device 105, or both, are located outside the retail environment, and the links 107 therefore include wide-area networks such as the Internet, mobile networks, and the like. The system 100 also includes a dock 108 for the apparatus 103 in the present example. The dock 108 is in communication with the server 101 via a link 109 that in the present example is a wired link. In other examples, however, the link 109 is a wireless link.

The client computing device 105 is illustrated in FIG. 1 as a mobile computing device, such as a tablet, smart phone or the like. In other examples, the client device 105 is implemented as another type of computing device, such as a desktop computer, a laptop computer, another server, a kiosk, a monitor, and the like. The system 100 can include a plurality of client devices 105 in communication with the server 101 via respective links 107.

The system 100 is deployed, in the illustrated example, in a retail environment including a plurality of shelf modules 110-1, 110-2, 110-3 and so on (collectively referred to as shelves 110, and generically referred to as a shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 are typically arranged in a plurality of aisles, each of which includes a plurality of modules 110 aligned end-to-end. In such arrangements, the shelf edges 118 face into the aisles, through which customers in the retail environment as well as the apparatus 103 may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to each of the support surface 117-3 and the underside (not shown) of the support surface 117-3. In other examples, the angles between the shelf edge 118-3 and the adjacent surfaces, such as the support surface 117-3, is more or less than ninety degrees.

The apparatus 103 is deployed within the retail environment, and communicates with the server 101 (e.g. via the link 107) to navigate, autonomously or partially autonomously, along a length 119 of at least a portion of the shelves 110. As will be described in greater detail below, the apparatus 103 is configured to navigate among the shelves 110 via the generation of one or more paths, each including a sequence of poses. Each pose includes a position and an orientation defined according to a frame of reference 102 established within the retail environment). The apparatus 103 is configured to travel along one of the above-mentioned paths.

The apparatus 103 is equipped with a plurality of navigation and data capture sensors 104, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 can be configured to employ the sensors 104 to both navigate among the shelves 110 (e.g. according to the paths mentioned above) and to capture shelf data during such navigation.

The server 101 includes a special purpose controller, such as a processor 120, specifically designed to control and/or assist the mobile automation apparatus 103 to navigate the environment and to capture data. The processor 120 can be further configured to obtain the captured data via a communications interface 124 for subsequent processing (e.g. to detect objects such as shelved products in the captured data, and detect status information corresponding to the objects). The server 101 may also be configured to transmit status notifications (e.g. notifications indicating that products are out-of-stock, low stock or misplaced) to the client device 105 responsive to the determination of product status data. The client device 105 includes one or more controllers (e.g. central processing units (CPUs) and/or field-programmable gate arrays (FPGAs) and the like) configured to process (e.g. to display) notifications received from the server 101.

The processor 120 is interconnected with a non-transitory computer readable storage medium, such as the above-mentioned memory 122, having stored thereon computer readable instructions for performing various functionality, including control of the apparatus 103 to capture shelf data, post-processing of the shelf data, and generating and providing certain navigational data to the apparatus 103, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The server 101 also includes the above-mentioned communications interface 124 interconnected with the processor 120. The communications interface 124 includes suitable hardware (e.g. transmitters, receivers, network interface controllers and the like) allowing the server 101 to communicate with other computing devices—particularly the apparatus 103, the client device 105 and the dock 108—via the links 107 and 109. The links 107 and 109 may be direct links, or links that traverse one or more networks, including both local and wide-area networks. The specific components of the communications interface 124 are selected based on the type of network or other links that the server 101 is required to communicate over. In the present example, as noted earlier, a wireless local-area network is implemented within the retail environment via the deployment of one or more wireless access points. The links 107 therefore include either or both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the application 128 or subcomponents thereof and in conjunction with the other components of the server 101, the processor 120 is configured to implement various functionality related to controlling the apparatus 103 to navigate among the shelves 110 and capture data. The processor 120, as configured via the execution of the control application 128, is also referred to herein as the controller 120. As will now be apparent, some or all of the functionality implemented by the controller 120 described below may also be performed by preconfigured special purpose hardware controllers (e.g. one or more FPGAs and/or Application-Specific Integrated Circuits (ASICs) configured for navigational computations) rather than by execution of the control application 128 by the processor 120.

Figure 2A:
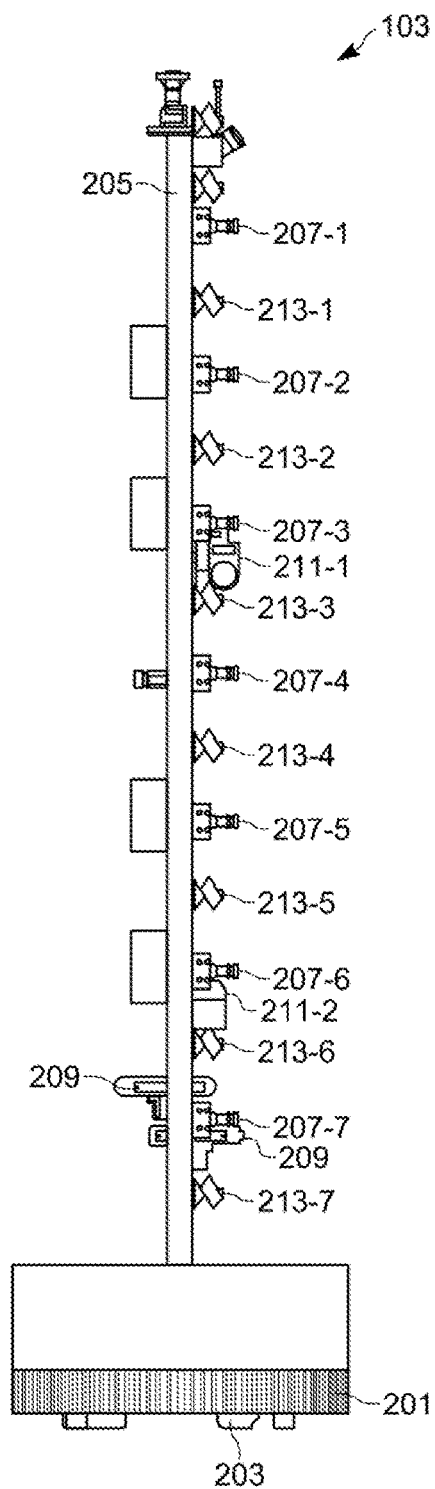
FIG. 2A depicts a mobile automation apparatus in the system of FIG. 1.
Figure 2B:
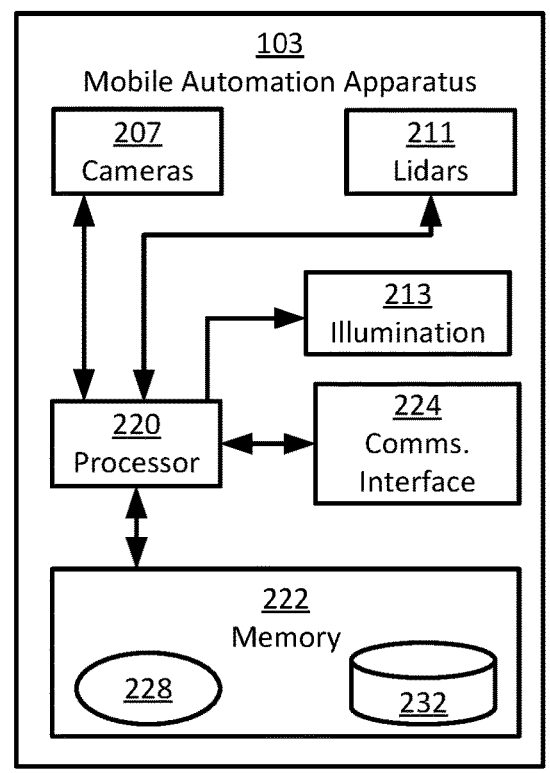
FIG. 2B is a block diagram of certain internal hardware components of the mobile automation apparatus in the system of FIG. 1.

Turning now to FIGS. 2A and 2B, the mobile automation apparatus 103 is shown in greater detail. The apparatus 103 includes a chassis 201 containing a locomotive mechanism 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 104 mentioned earlier. In particular, the sensors 104 include at least one imaging sensor 207, such as a digital camera, as well as at least one depth sensor 209, such as a 3D digital camera. The apparatus 103 also includes additional depth sensors, such as LIDAR sensors 211. In other examples, the apparatus 103 includes additional sensors, such as one or more RFID readers, temperature sensors, and the like.

In the present example, the mast 205 supports seven digital cameras 207-1 through 207-7, and two LIDAR sensors 211-1 and 211-2. The mast 205 also supports a plurality of illumination assemblies 213, configured to illuminate the fields of view of the respective cameras 207. That is, the illumination assembly 213-1 illuminates the field of view of the camera 207-1, and so on. The sensors 207 and 211 are oriented on the mast 205 such that the fields of view of each sensor face a shelf 110 along the length 119 of which the apparatus 103 is travelling. The apparatus 103 is configured to track a location of the apparatus 103 (e.g. a location of the center of the chassis 201) in a common frame of reference previously established in the retail facility, permitting data captured by the mobile automation apparatus to be registered to the common frame of reference.

The mobile automation apparatus 103 includes a special-purpose navigational controller, such as a processor 220, as shown in FIG. 2B, interconnected with a non-transitory computer readable storage medium, such as a memory 222. The memory 222 includes a combination of volatile (e.g. Random Access Memory or RAM) and non-volatile memory (e.g. read only memory or ROM, Electrically Erasable Programmable Read Only Memory or EEPROM, flash memory). The processor 220 and the memory 222 each comprise one or more integrated circuits. The memory 222 stores computer readable instructions for execution by the processor 220. In particular, the memory 222 stores a navigation application 228 which, when executed by the processor 220, configures the processor 220 to perform various functions discussed below in greater detail and related to the navigation of the apparatus 103 (e.g. by controlling the locomotive mechanism 203). The application 228 may also be implemented as a suite of distinct applications in other examples.

The processor 220, when so configured by the execution of the application 228, may also be referred to as a navigational controller 220. Those skilled in the art will appreciate that the functionality implemented by the processor 220 via the execution of the application 228 may also be implemented by one or more specially designed hardware and firmware components, such as FPGAs, ASICs and the like in other embodiments.

The memory 222 may also store a repository 232 containing, for example, a map of the environment in which the apparatus 103 operates, for use during the execution of the application 228. The apparatus 103 may communicate with the server 101, for example to receive instructions to navigate to specified locations and initiate data capture operations, via a communications interface 224 over the link 107 shown in FIG. 1. The communications interface 224 also enables the apparatus 103 to communicate with the server 101 via the dock 108 and the link 109.

In the present example, as discussed below, the apparatus 103 is configured (via the execution of the application 228 by the processor 220) to generate navigational paths to travel through the environment, for example to reach goal locations provided by the server 101. The apparatus 103 is also configured to control the locomotive mechanism 203 to travel along the above-mentioned paths. In addition, the apparatus 103 is configured to store certain data generated during the generation of the above-mentioned paths, for use in generating further paths to navigate around newly detected obstacles. The generation of additional paths (e.g. responsive to changes in the environment) is referred to as re-planning. As will be apparent in the discussion below, in other examples, some or all of the processing performed by the server 101 may be performed by the apparatus 103, and some or all of the processing performed by the apparatus 103 may be performed by the server 101. That is, although in the illustrated example the application 228 resides in the mobile automation apparatus 103, in other embodiments the actions performed by some or all of the components of FIG. 2C may be performed by the processor 120 of the server 101, either in conjunction with or independently from the processor 220 of the mobile automation apparatus 103. As those of skill in the art will realize, distribution of navigational computations between the server 101 and the mobile automation apparatus 103 may depend upon respective processing speeds of the processors 120 and 220, the quality and bandwidth of the link 107, as well as criticality level of the underlying instruction(s). For instance, in one embodiment, at least the obstacle detection and avoidance instructions are performed directly by the processor 220 of the mobile automation apparatus.

Figure 2C:
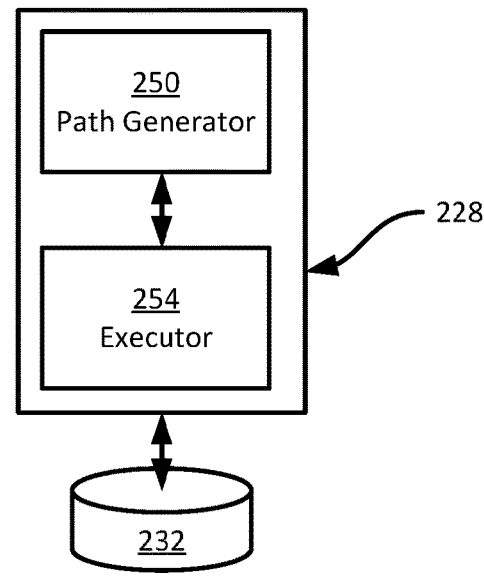
FIG. 2C is a block diagram of certain internal components of the apparatus of FIG. 1.

Turning now to FIG. 2C, before describing the actions taken by the apparatus 103 to generate navigational data, certain components of the application 228 will be described in greater detail. As will be apparent to those skilled in the art, in other examples the components of the application 228 may be separated into distinct applications, or combined into other sets of components. Some or all of the components illustrated in FIG. 2C may also be implemented as dedicated hardware components, such as one or more ASICs or FPGAs.

The application 228 includes a path generator 250 configured to generate paths for execution by the apparatus 103 to navigate the environment in which the apparatus 103 is deployed. The path generator 250 is further configured to refine such paths during execution, and perform path re-planning when obstacles are detected that interrupt a path under execution. The application 228 also includes an executor 254 configured to control the locomotive mechanism 203 to travel along the paths provided by the generator 250. The executor 254 is also configured to detect obstacles, localize the apparatus 103 (e.g. relative to the frame of reference 102) and update the map stored in the repository 232.

Figure 3:
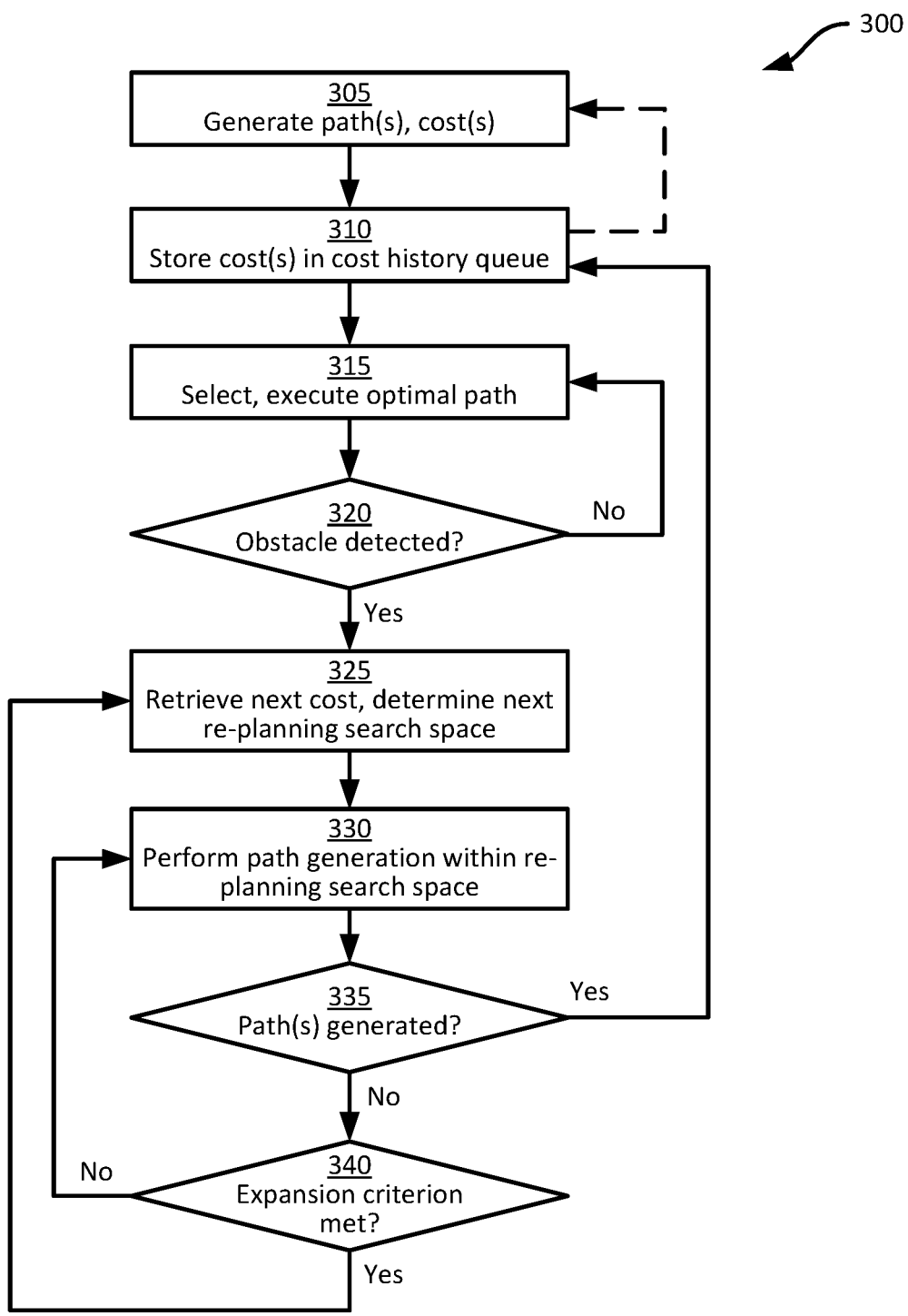
FIG. 3 is a flowchart of a method for path generation at the apparatus of FIG. 1.

The functionality of the application 228 will now be described in greater detail. In particular, the generation and re-planning of navigational paths will be described as performed by the apparatus 103. Turning to FIG. 3, a method 300 of generating navigational paths is shown. The method 300 will be described in conjunction with its performance by the apparatus 103, with reference to the components illustrated in FIG. 2C.

At block 305, the path generator 250 is configured to generate a plurality of paths extending from a starting location to a goal, or destination, location. The starting and goal locations are defined according to the frame of reference 102, in the present example. The starting location is typically the current location of the apparatus 103, and the goal location may be received at the apparatus 103 from the server 101, for example as an instruction to travel to the goal location to being a data capture operation. The path generator 250 is also configured, at block 305, to generate a cost associated with each of the above-mentioned paths. At block 310, the path generator 250 is configured to store at least a subset of the costs generated at block 305 in a cost history queue, as will be described below in greater detail.

Various processes can be employed to generate the paths and costs at block 305. In the present example, the path generator 250 generates paths and costs by performing an iterative path search operation. More specifically, the path generator 250 is configured to perform a tree-based iterative path search operation, such as the Informed Rapidly exploring Random Tree (RRT*) or Batch Informed Tree (BIT*) operations. As will be apparent to those skilled in the art, search operations such as Informed RRT* and BIT* randomly sample a search space (e.g. defined according to the frame of reference 102) for points that do not collide with obstacles defined in the map stored in the repository 232. The search operations grow trees from the starting location by expanding toward such samples, until one or more branches have been generated that extend from the starting location to the goal location. In other implementations, the tree is grown beginning at the goal location to generate a path that reaches the starting location, rather than beginning at the starting location. As will also be apparent to those skilled in the art, when a path has been found, the performance of the search operation (i.e. the expansion of the search tree) can be continued to find one or more additional paths. The above process can be repeated until a predefined number of paths have been generated, or until a path has been generated that meets a cost threshold (e.g. that has a cost below a predefined cost threshold).

Informed RRT* and BIT*, in particular, involve contracting the search space in response to generating a path. That is, when a branch of the tree extends from the starting location to the goal location, a contracted search space (typically elliptical) is generated based on the cost of the path defined by that branch. The search for paths then continues within the contracted search space. The search space is further contracted each time a new path is generated, until a path is generated that meets a criterion for terminating the search operation, such as a cost threshold. When the search operation is terminated, the final path generated (i.e. the path with the lowest cost) is selected as the optimal path for execution.

Figure 4:
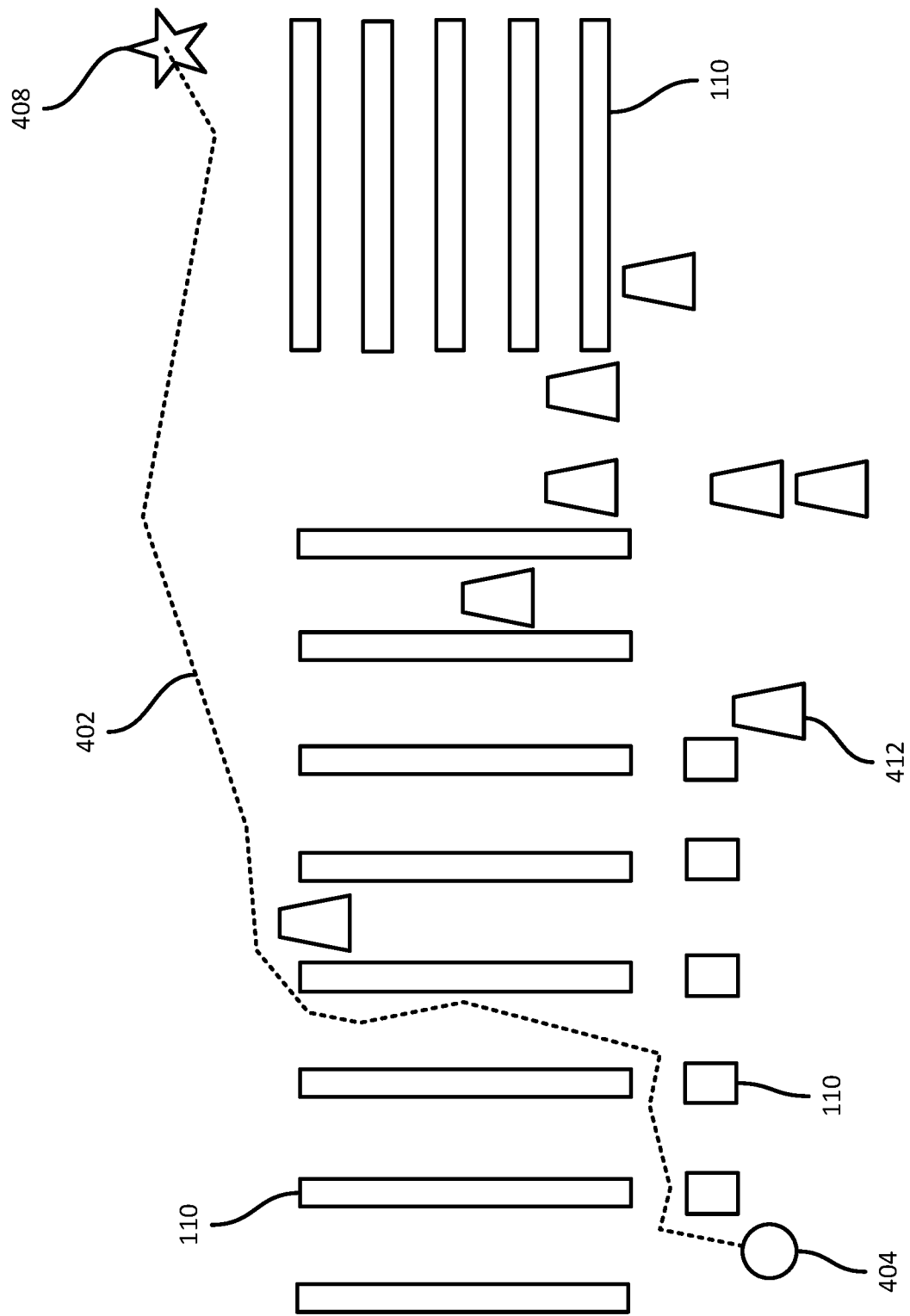
FIGS. 4 and 5 illustrate example performances of block 305 of the method of FIG. 3.

Turning to FIG. 4, an example performance of block 305 is depicted. In particular, FIG. 4 illustrates a first path 402 generated between a starting location 404 and a goal location 408. The path 402 corresponds to one branch of a tree (not shown) generated by randomly sampling a search space defined by a map stored in the repository 232 and containing the locations of a plurality of shelf modules 110 and obstacles 412. The path generator 250 is also configured to generate a cost for the path 402, such as the length of the path 402. For instance, the length of the path in the present example is assumed to be 26 m.

Figure 5:
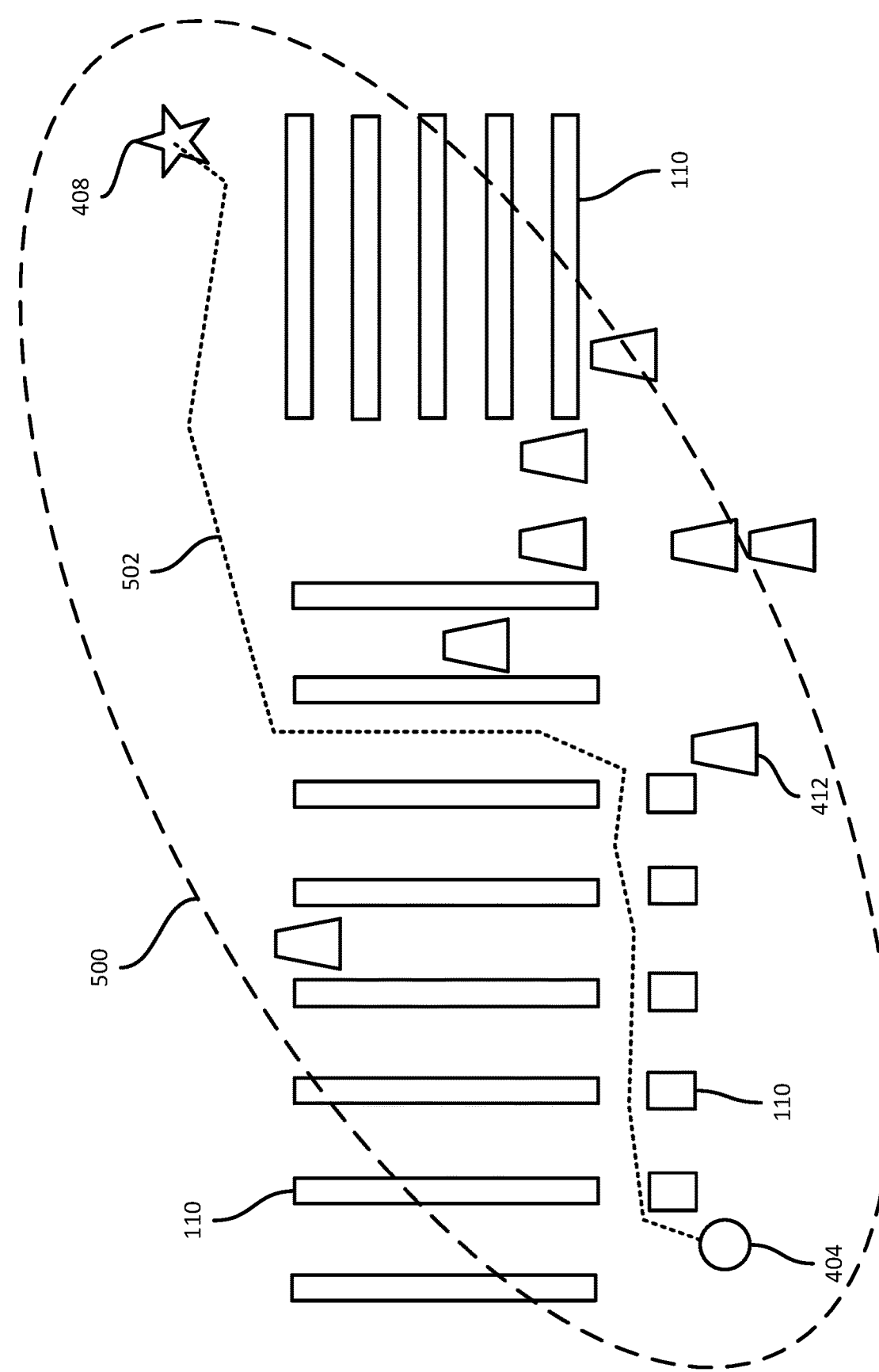

As noted above, when a search operation such as Informed RRT* or BIT* is employed for path generation at block 305, following generation of the path 402, the path generator 250 is configured to contract the search space according to the cost of the path 402, as discussed below. Turning to FIG. 5, rather than the search space encompassing the entire map as in FIG. 4, a contracted search space 500 has been generated, based on the cost (e.g. length) of the path 402. In particular, the contracted search space 500 is an ellipse with respective foci at the starting location 404 and the goal location 408. The width of the contracted search space (i.e. twice the semi-minor axis of the ellipse) is determined based on the length of the path 402. Specifically, the dimension of the semi-minor axis of the ellipse is selected to contain all the possible paths (which have not yet been generated) with costs less than or equal to the cost of the path 402 (i.e. the lowest-cost path generated thus far). For example, the semi-minor axis can be determined by setting the length of a segment extending from one of the foci (i.e. the starting location 404 or the goal location 408) to one of the co-vertices (i.e. the intersection of the minor axis with the perimeter of the ellipse) as one half of the length of the path 402.

Having generated the contracted search space 500, the path generator 250 is configured to continue the iterative search operation initiated as shown in FIG. 4. Prior to continuing the search operation, the path generator 250 can be configured to determine whether a termination criterion has been met. Examples of termination criteria include determining whether the most recently generated path has a cost that is below a predetermined cost threshold, whether a predefined number of paths have been generated, or the like.

FIG. 5 illustrates a second path 502, generated by continuing the search operation within the contracted search space 500, extending from the starting location 404 to the goal location 408. The path 502 has a lower cost (e.g. 22 m) than the path 402, and therefore triggers a further contraction of the search space. The above process (contracting the search space and searching for a less costly path within the contracted search space) is repeated until the above-mentioned termination criterion is met.

In the present example, it is assumed that the path 502 meets the termination criterion, and the search operation therefore ceases. Returning to FIG. 3, it will now be apparent that FIGS. 4 and 5 illustrate two successive performances of block 305 (indicated by the dashed line returning from block 310 to block 305). At block 310, the path generator 250 is configured to store the cost for each path generated at block 305 in a cost history queue. In particular, the cost of each path generated at block 305 that led to generation of a contracted search space is stored. The cost history queue is stored in the repository 232 in the present example. Table 1 illustrates an example cost history queue.

TABLE 1

Example Cost History Queue

| Path ID | Cost (m) |
|---|---|
| 502 | 22 |
| 402 | 26 |

As shown above, the cost history queue lists the costs of each path generated at block 305 in ascending order, such that the most recently generated path (having the lowest cost) is the top-most cost in the queue. The path identifiers shown above are included for illustrative purposes, and need not be stored in the cost history queue in the repository 232. In the present example, the path generator 250 is configured to store every cost generated at block 305 in the cost history queue. In other embodiments, smaller subsets of the costs can be stored in the queue. Minimally, the path generator 250 stores the most recently generated (i.e. the lowest) cost in the queue. The performance of block 310 contrasts with conventional implementations of path generation processes such as Informed RRT* and BIT*, in which no cost history queue is maintained (i.e. in which only the selected optimal path is stored, with all other data generated during the performance of block 305 being discarded).

At block 315, the executor 254 is configured to select an optimal path for execution from the plurality of paths generated at block 305. The executor 254 is configured to select the path with the lowest cost among the paths generated at block 305 as the optimal path. Execution of the path is performed by the executor 254, in the present example, by generating a plurality of poses from the path and controlling the locomotive mechanism 203 to carry the apparatus 103 through the poses.

During execution of the path, the executor 254 is also configured to maintain a current location of the apparatus 103, as well as an indication of the distance traveled along the path under execution. The executor 254 is also configured to monitor for obstacles not represented in the map stored in the repository 232, for example by capturing and processing depth measurements (e.g. from a forward-facing LiDAR sensor mounted on the chassis 201). Thus, at block 320 the executor 254 is configured to determine whether an obstacle has been detected during execution of the optimal path.

Figure 6:
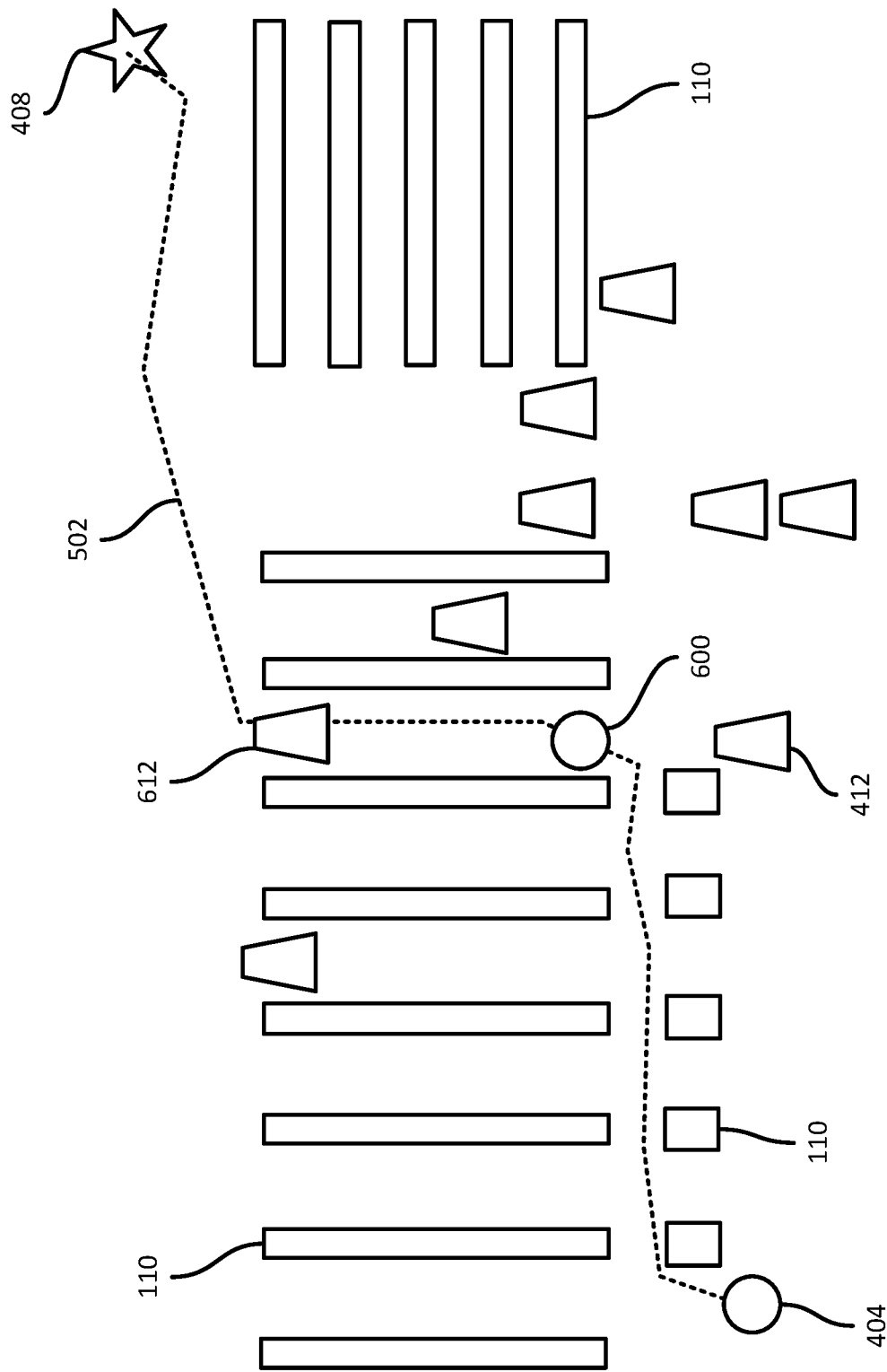
FIG. 6 illustrates the detection of an obstacle in the path under execution during the performance of the method of FIG. 3.

When the determination at block 320 is negative, execution of the path continues at block 315. When the determination at block 320 is affirmative, however, performance of the method 300 proceeds to block 325. Turning to FIG. 6, the path 502 is shown along with a current location 600 of the apparatus 103 illustrating that the apparatus 103 has completed execution of a portion of the path 502. In addition, FIG. 6 includes an obstacle 612 (e.g. a person, a shopping cart, a newly installed shelf structure, or another unexpected object) detected by the apparatus 103 but not previously represented in the map, and therefore not accounted for during the performance of block 305. Execution of the path 502 therefore cannot be completed.

Responsive to detecting the obstacle 612, the apparatus 103 is configured, in the present example, to stop and cease execution of the path 502 and to initiate a re-planning process discussed below. In some examples, for example while the obstacle continues to be located at least a predetermined distance away, the apparatus 103 may continue temporarily executing the path 502 while performing the re-planning process.

At block 325, the path generator 250 (e.g. upon receiving a request from the executor 254 to generate a new path as a result of an obstruction in the previous optimal path) is configured to retrieve the next cost from the cost history queue, and to determine a re-planning search space based on the retrieved cost. The next cost retrieved at block 325 is the lowest cost for which a re-planning search space has not already been generated. In other words, through successive performances of block 325, increasingly larger re-planning search spaces are generated by traversing the cost history queue from lowest cost to highest cost. The re-planning process described herein contrasts with re-planning in conventional implementations of path generation processes such as Informed RRT* and BIT*, in which re-planning is performed by beginning a path generation operation that samples a search space representing the entire map stored in the repository 232.

Thus, in the present example performance of the method 300, at the first performance of block 325 following the detection of the obstacle 612, the path generator 250 is configured to retrieve the cost corresponding to the path 502 itself (i.e., 22 m). The path generator 250 is then configured to generate a re-planning search space, such as an elliptical search space, based on the retrieved cost. More specifically, the path generator 250 is configured to generate the re-planning search space based not only on the retrieved cost, but also on the distance traveled along the optimal path (i.e. the path 502 in this example) before the obstacle 612 was detected. For example, the distance traveled between the locations 404 and 600 along the path 502, as shown in FIG. 6, is 10 m.

The re-planning search space, in the present example, is generated as an elliptical search space with foci defined by the current location 600 and the goal location 408. Further, the width of the elliptical re-planning search space is defined based on the difference between the cost retrieved at block 325 and the distance traveled. Thus, in the present example, the width of the elliptical re-planning search space is defined based on a distance of 12 m. For example, as noted above in connection with generation of a contracted search space, the semi-minor axis of the re-planning search space can be determined by setting the length of a segment extending from one of the foci (i.e. the current location 600 or the goal location 408) to one of the co-vertices (i.e. the intersection of the minor axis with the perimeter of the ellipse) as one half of the difference between the retrieved cost and the distance traveled (that is, 6 m in the present example).

Figure 7A:
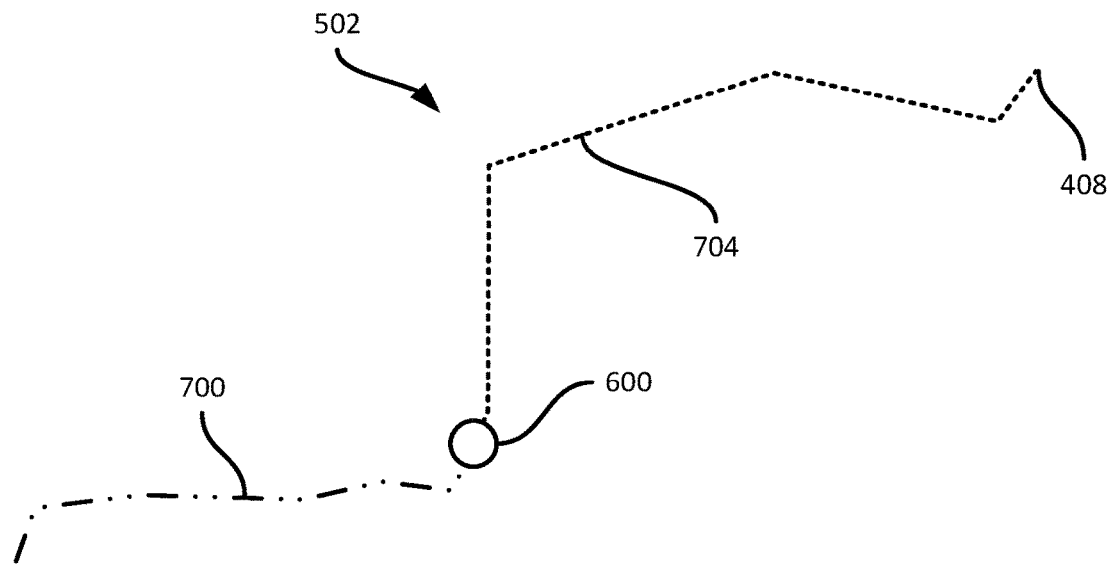
FIGS. 7A-7B illustrate the generation of a re-planning search space responsive to detection of the obstacle shown in FIG. 6.
Figure 7B:
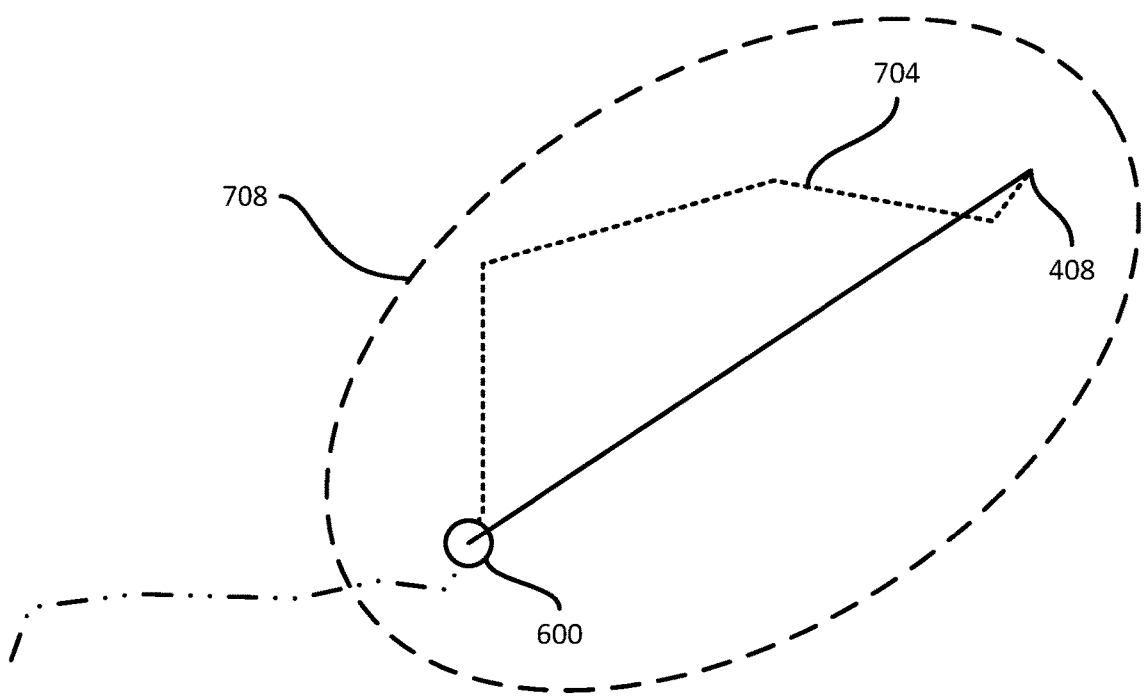

FIGS. 7A and 7B illustrate an example performance of block 325. In particular, FIG. 7A illustrates the path 502 in isolation from the remainder of the map. The path 502 is shown divided into a completed portion 700 and an uncompleted portion 704. The path generator 250 is configured to calculate a "remaining cost" by subtracting the cost associated with a distance traveled, corresponding to the length of the completed portion 700, from the total cost associated with the path 502. FIG. 7B illustrates an elliptical re-planning search space 708 determined based on the remaining cost. For example, the semi-minor axis can be determined by setting the length of a segment extending from one of the foci (i.e. the current location 600 or the goal location 408) to one of the co-vertices (i.e. the intersection of the minor axis with the perimeter of the ellipse) as one half of the remaining cost.

Returning to FIG. 3, at block 330, the path generator 250 is configured to perform a path generation operation within the re-planning search space to generate a re-planned path. Following the detection of an obstacle, performing the path generation operation at block 330 includes initiating the path generation operation within the re-planning search space generated at block 325. Initiating generation of a re-planned path involves the beginning of a new iterative search operation (e.g. via Informed RRT*, BIT* or a similar algorithm), rather than a continuation of the search operation initiated at block 305. That is, the search tree generated at block 305 is discarded (or may have been previously discarded, for example at block 315) and a new tree is generated by sampling points within the re-planning search space. In other examples, rather than discarding the tree, the path generator 250 is configured to prune the tree generated at block 305 to remove any branches that intersect with the newly detected obstacle (e.g. the obstacle 612 in the present example), and to then continue expansion of the pruned tree via sampling in the re-planning search space to generate a path around the obstacle 612. The above approach of performing re-planning based on a pruned version of the tree from block 305 may be particularly effective for implementations in which the tree is grown beginning at the goal location.

Responsive to initiating the re-planning path generation operation at block 330, the path generator 250 is configured to determine (e.g. after each point sampled in an Informed RRT* or BIT* operation) whether a path has been generated at block 335. That is, the path generator 250 is configured to determine whether a tree branch has been generated that extends from the current location 600 to the goal location 408. When the determination at block 335 is negative, the path generator 250 is configured to proceed to block 340. At block 340, the path generator 250 is configured to determine whether an expansion criterion has been met.

As will be apparent from the discussion above, the re-planning process performed by the path generator 250, rather than searching the entire map of the environment, begins with a re-planning search space determined according to the recently-obstructed optimal path. The use of a restricted re-planning search space may reduce the time required to generate a re-planned path, but in some cases the re-planning search space may be sufficiently small as to not contain a viable path (or to contain a viable path that passes sufficiently close to one or more obstacles that discovering the path via random sampling may be undesirably time-consuming). The path generator 250 is therefore configured to generate an expanded re-planning search space under certain conditions, referred to as expansion criteria.

In the present example, the expansion criterion evaluated at block 340 is a density of sampled points within the re-planning search space 708. When a sufficient number of randomly selected points have been sampled to reach a predefined threshold sample density, the determination at block 340 is affirmative. Other expansion criteria include, for example, processing time (e.g. when the amount of time spent searching for paths in the re-planning search space reaches a predefined threshold time period, the determination at block 340 is affirmative).

When the determination at block 340 is negative, performance of the re-planning path searching operation continues at block 330. When the determination at block 340 is affirmative, however, the path generator 250 returns to block 325 to retrieve the next cost in the cost history queue and generate an expanded re-planning search space. The next re-planning search space is referred to as expanded because the next cost (26 m, in the present example) is greater than the previously retrieved cost, and the resulting elliptical search space therefore has a greater width.

The performance of blocks 325 to 340 is repeated until a path is generated for one of the re-planning search spaces, resulting in an affirmative determination at block 335. Each subsequent performance of blocks 325 and 330, following a negative determination at block 340, need not initiate a new search operation. Rather, subsequent performances of blocks 325 and 330 continue construction of the existing search tree. If the cost history queue is exhausted through successive performances of block 325 without a path being found, the re-planning process continues, using the entire map as a re-planning search space.

Following an affirmative determination at block 335, the path generator 250 is configured to return to block 310, at which the cost for the re-planned path is stored in the cost history queue. Prior to storing the cost for the re-planned path in the cost history queue, the cost history queue is cleared and the distance traveled is reset to zero.

Figure 8:
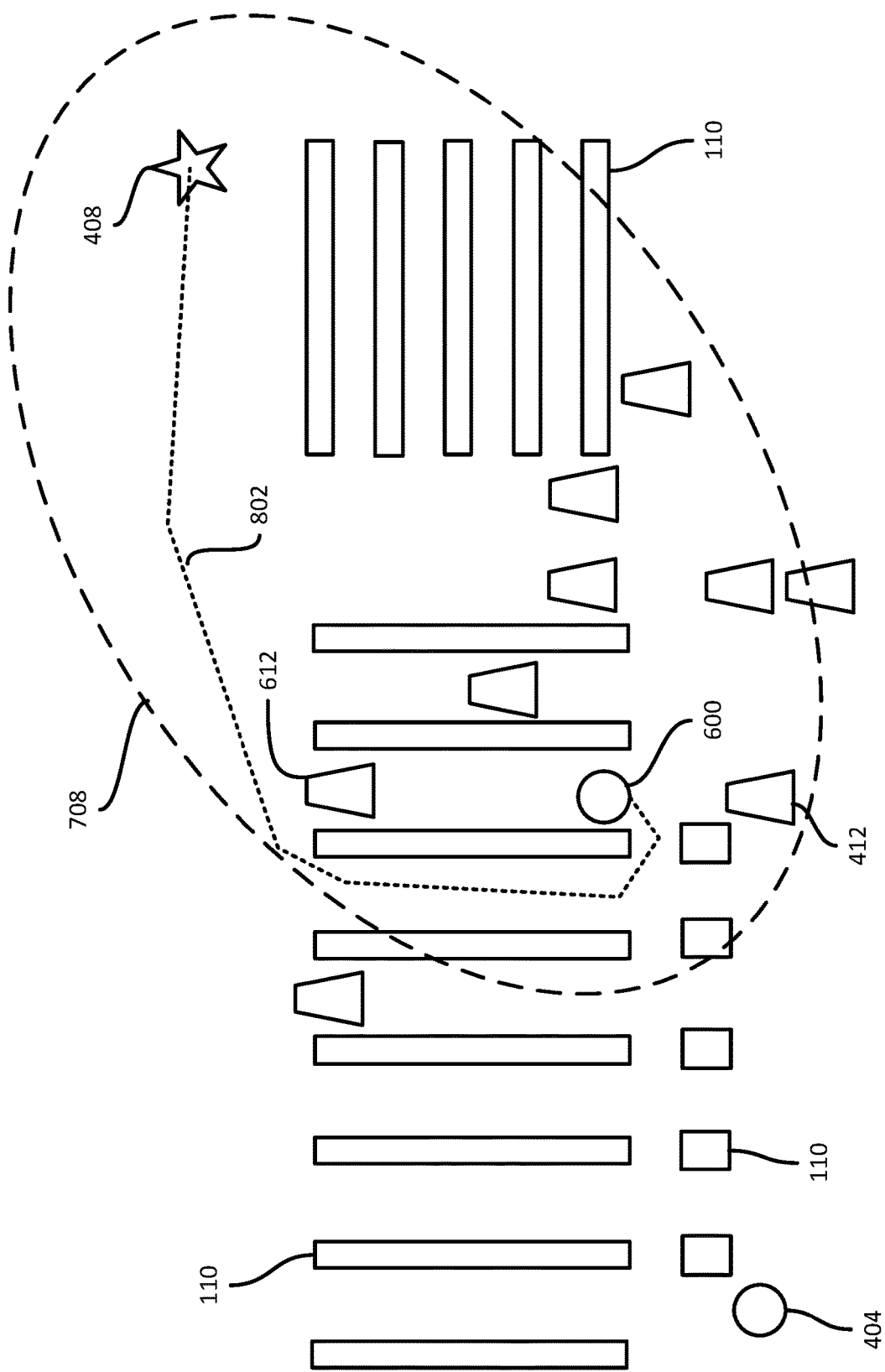
FIG. 8 illustrates the generation of a re-planned path.

Turning to FIG. 8, the re-planning search space 708 is shown, along with a re-planned path 802 generated within the re-planning search space 708 and bypassing the obstacle 612 to reach the goal location 408. The generation of the path 802 results in an affirmative determination at block 335, and at block 310 the cost of the path 802 is therefore stored in the cost history queue. Table 2 illustrates the contents of the cost history queue following the affirmative determination at block 335 and the performance of block 310.

TABLE 2

Example Updated Cost History Queue

| Path ID | Cost (m) |
|---------|----------|
| 802     | 14       |

As noted above, the cost history queue is cleared before the cost of the path 802 is stored therein. In the example above, therefore, the cost of the path 802 is the only cost stored at block 310. In other examples, however, a plurality of paths may be generated during the re-planning process, via the mechanism discussed above in connection with FIGS. 4 and 5. That is, when a re-planned path is generated, a contracted search space may be generated based on the cost of the re-planned path, and the search for re-planned paths may be continued within the contracted search space, and further contracted search spaces, until a termination criterion is met.

Following generation of a re-planned path and storage of the cost associated with the re-planned path at block 310, the performance of the method 300 continues at block 315 as described above.

Figure 9:
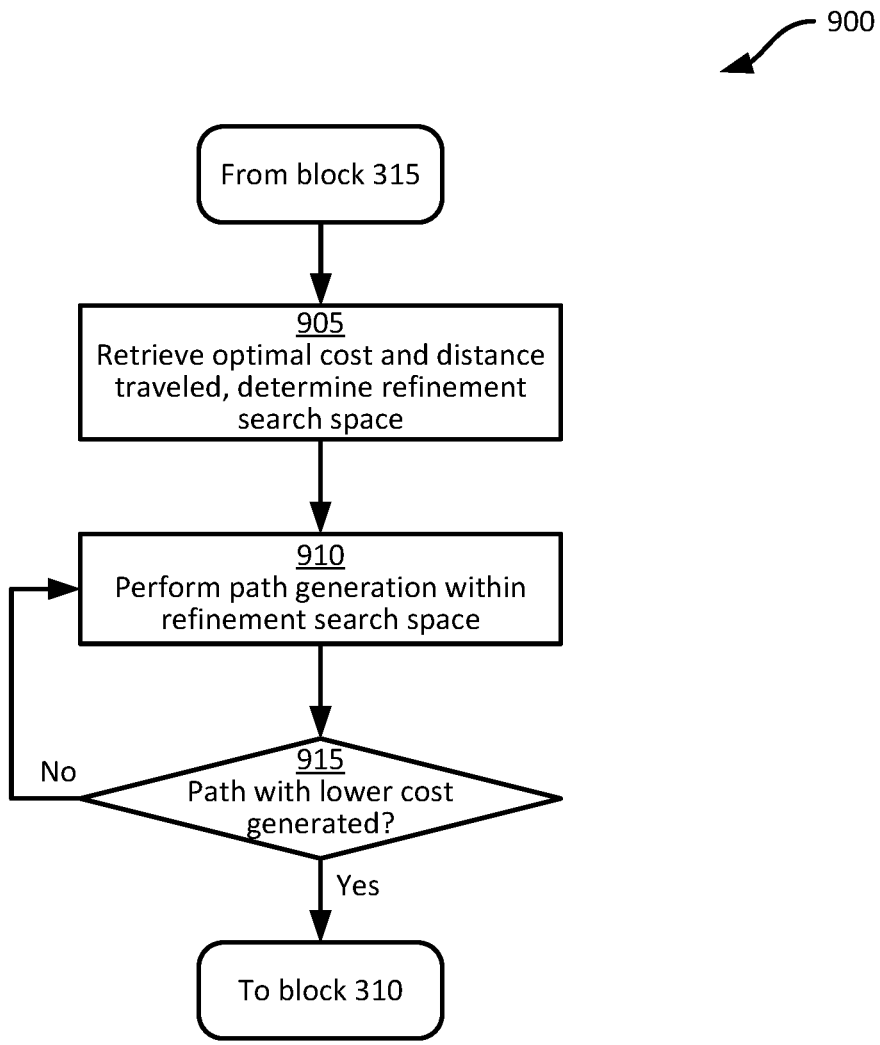
FIG. 9 is a flowchart of a method of generating a refined path.

In some embodiments, the path generator 250 is also configured to generate one or more refined paths during the execution of the optimal path at block 315. In particular, referring to FIG. 9, a method 900 of generating a refined path is illustrated. The method 900 is performed simultaneously with the performance of block 315. That is, in the present example the execution of the optimal path is not interrupted by the performance of the method 900.

At block 905, the path generator 250 is configured to retrieve the optimal cost (that is, the cost corresponding to the path currently under execution at block 315) from the cost history queue. The path generator 250 is also configured to retrieve the distance traveled along the optimal path, and to determine a refinement search space based on the optimal cost and the distance traveled.

Generation of the refinement search space is performed as described above in connection with block 325. That is, the path generator 250 is configured to set a length of an elliptical refinement search space according to the current location of the apparatus 103 and the goal location 408. The path generator 250 is further configured to set a width of the refinement search space based on the difference between the optimal cost and the cost associated with the distance traveled along the optimal path.

Figure 10:
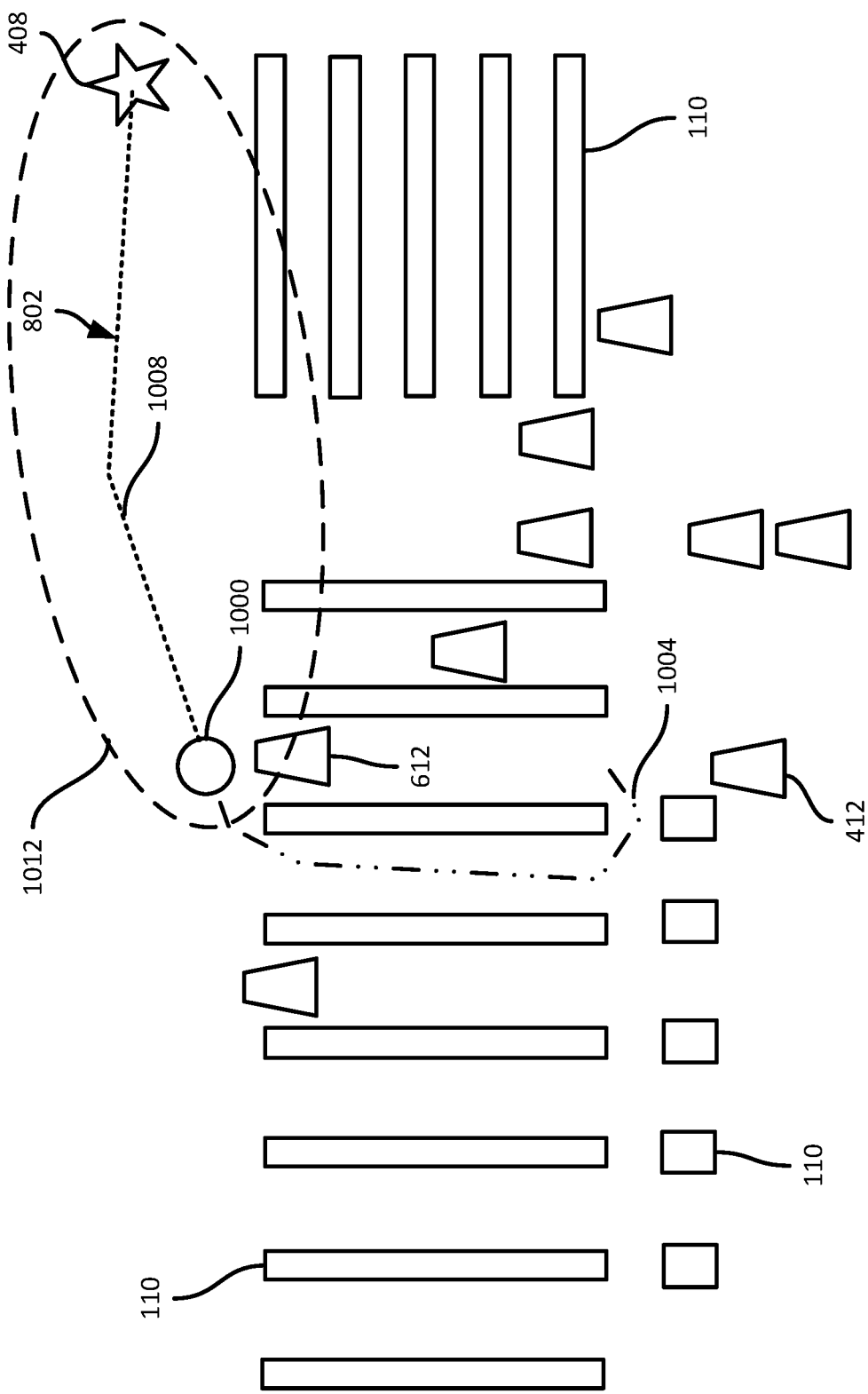
FIGS. 10 and 11 illustrate the performance of the method of FIG. 9.

Referring to FIG. 10, the path 802 is illustrated, divided by a current location 1000 of the apparatus 103 between a completed portion 1004 and an uncompleted portion 1008. The path generator 250 is configured to generated a refinement search space 1012 with a width based on the difference between the portion 1004 and the total length of the path 802 (i.e. based on the length of the portion 1008).

Returning to FIG. 9, at block 910 the path generator 250 is configured to perform a path generation operation within the refinement search space. In the present example, the path generation operation performed at block 910 need not be a newly initiated operation (i.e. with a new search tree). Instead, the operation performed at block 910 is a continuation of the operation in which the path 802 itself was generated.

At block 915, the path generator 250 is configured to determine whether a path has been generated via the operation performed at block 910 that has a lower cost than the uncompleted portion of the optimal cost (i.e. the cost of the portion 1008 of the path 802). When no path has been generated, or when a path with a higher cost has been generated, the performance of block 910 continues. However, when a lower-cost path has been generated, the path generator 250 returns to block 310, at which the cost of the lower-cost refinement path is stored in the cost history queue, and the refinement path is executed (rather than the previous optimal path).

Figure 11:
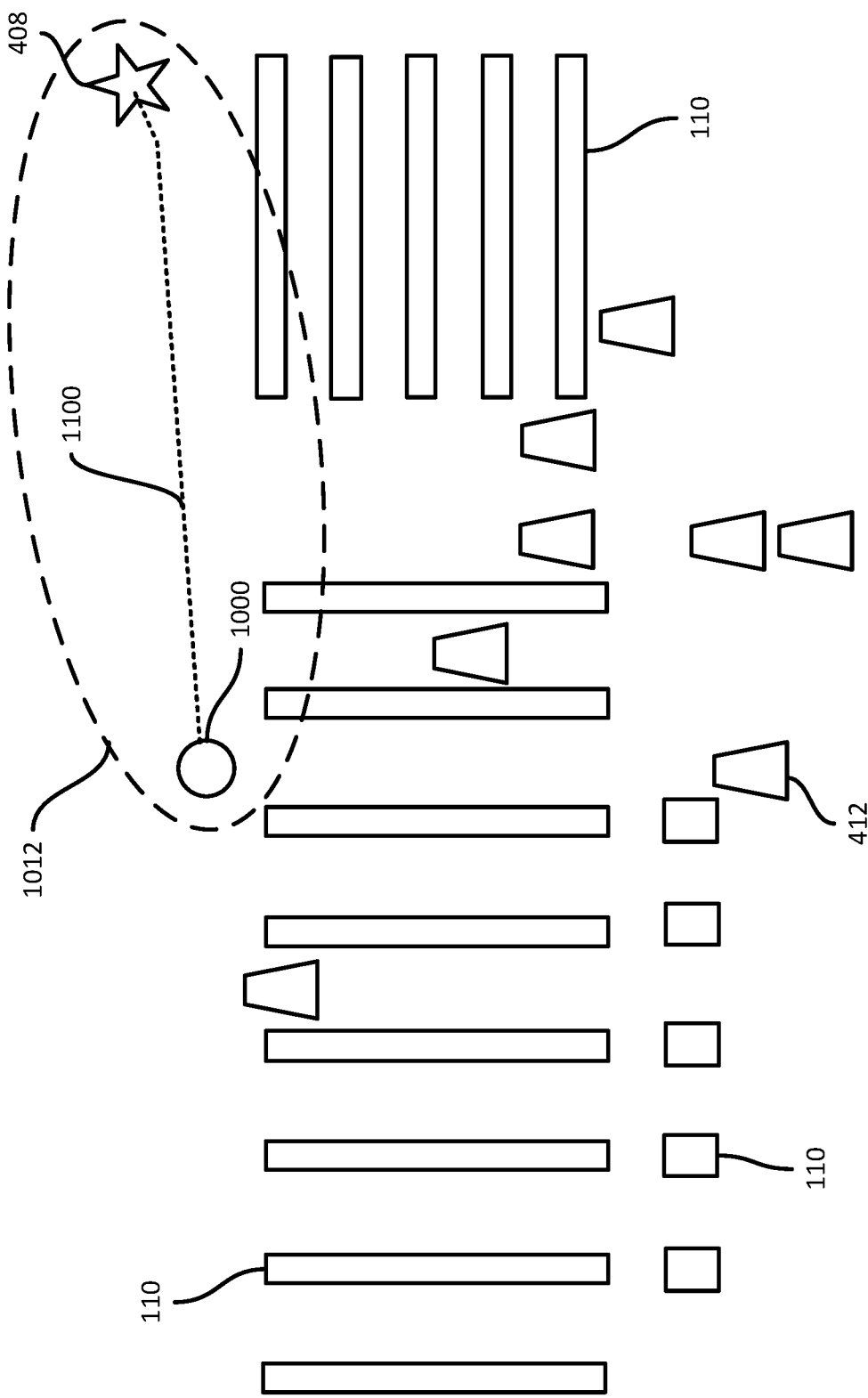

Turning to FIG. 11, a refinement path 1100 generated at block 910 and having a lower cost than the portion 1008 of the path 802 is illustrated. The path 1100 is therefore passed to the executor 254 for execution instead of the path 802, and the cost of the path 1100 (e.g. 6 m) is summed with the cost associated with the completed portion 1004 (e.g. 4 m) of the previous optimal path 802 is added to the cost history queue (e.g. for use in re-planning in the event of an obstruction). Table 3 provides an example of the updated cost history queue from Table 2, following generation of the path 1100.

TABLE 3

Example Updated Cost History Queue

| Path ID | Cost (m) |
|---------|----------|
| 1100    | 10       |
| 802     | 14       |

As will now be apparent, the method 900 can be repeated for the next performance of block 315, during which the executor 254 begins execution of the path 1100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamic path generation in a navigational controller, the method comprising:
   generating (i) a plurality of paths extending from a starting location to a goal location, and (ii) a cost for each of the paths;
   selecting, based on the costs, an optimal path for execution from the plurality of paths;

storing a subset of the costs in a cost history queue;
responsive to detecting an obstacle during execution of the optimal path, retrieving one of the costs from the cost history queue;
determining an initial re-planning search space based on the cost retrieved from the cost history queue;
initiating generation of a re-planned path within the initial re-planning search space;
responsive to initiating the generation of the re-planned path and prior to the generation of the re-planned path, determining whether an expansion criterion has been met;
when the expansion criterion has been met, retrieving a further one of the costs from the cost history queue;
determining a further re-planning search space based on the further cost; and
continuing the generation of the re-planned path within the further re-planning search space.

2. The method of claim 1, wherein the costs represent lengths of the paths.

3. The method of claim 1, wherein the subset of the costs includes the cost corresponding to the optimal path.

4. The method of claim 3, wherein the subset of the costs includes an additional cost corresponding to an additional one of the plurality of paths.

5. The method of claim 1, further comprising:
prior to initiating generation of the re-planned path, ceasing the execution of the optimal path.

6. The method of claim 1, wherein determining the initial re-planning search space is based on the cost retrieved from the cost history queue and on a distance traveled along the optimal path prior to initiating generation of the re-planned path.

7. The method of claim 1, wherein the expansion criterion is a threshold sample density within the initial re-planning search space.

8. The method of claim 1, further comprising, prior to detecting the obstacle:
determining a refinement search space based on the cost corresponding to the optimal path and a distance traveled along the optimal path;
generating a refinement path within the refinement search space; and
executing the refinement path in place of the optimal path.

9. The method of claim 1, wherein the initial re-planning search space represents a portion of a map containing the starting location and the goal location.

10. A mobile automation apparatus, comprising:
a navigational controller including a path generator configured to:
generate (i) a plurality of paths extending from a starting location to a goal location, and (ii) a cost for each of the paths;
select, based on the costs, an optimal path for execution from the plurality of paths; and
store a subset of the costs in a cost history queue;
the navigational controller further including an executor configured to control a locomotive mechanism of the mobile automation apparatus to execute the optimal path;
the path generator further configured, responsive to detection of an obstacle during the execution of the optimal path, to:
retrieve one of the costs from the cost history queue;
determine an initial re-planning search space based on the cost retrieved from the cost history queue; and
initiate generation of a re-planned path within the initial re-planning search space,
wherein:
the navigational controller is further configured to:
responsive to initiating the generation of the re-planned path and prior to the generation of the re-planned path, determine whether an expansion criterion has been met,
when the expansion criterion has been met, retrieve a further one of the costs from the cost history queue,
determine a further re-planning search space based on the further cost, and
continue the generation of the re-planned path within the further re-planning search space.

11. The mobile automation apparatus of claim 10, wherein the costs represent lengths of the paths.

12. The mobile automation apparatus of claim 10, wherein the subset of the costs includes the cost corresponding to the optimal path.

13. The mobile automation apparatus of claim 12, wherein the subset of the costs includes an additional cost corresponding to an additional one of the plurality of paths.

14. The mobile automation apparatus of claim 10, wherein the navigational controller is further configured to cease execution of the optimal path prior to initiating generation of the re-planned path.

15. The mobile automation apparatus of claim 10, wherein the navigational controller is configured to determine the initial re-planning search space based on the cost retrieved from the cost history queue and on a distance traveled along the optimal path prior to initiating generation of the re-planned path.

16. The mobile automation apparatus of claim 10, wherein the expansion criterion is a threshold sample density within the initial re-planning search space.

17. The mobile automation apparatus of claim 10, the navigational controller further configured, prior to detecting the obstacle, to:
determine a refinement search space based on the cost corresponding to the optimal path and a distance traveled along the optimal path;
generate a refinement path within the refinement search space; and
execute the refinement path in place of the optimal path.

18. The mobile automation apparatus of claim 10, wherein the initial re-planning search space represents a portion of a map containing the starting location and the goal location.

* * * * *